United States Patent [19]

Thomas

[11] 3,925,104

[45] Dec. 9, 1975

[54] THERMOCOUPLE TAPE

[75] Inventor: Ralph D. Thomas, Cleveland, Ohio

[73] Assignee: The United States of America as represented by the United States National Aeronautics and Space Administration Office of General Counsel Code GP, Washington, D.C.

[22] Filed: May 17, 1972

[21] Appl. No.: 254,323

Related U.S. Application Data

[62] Division of Ser. No. 104,885, Jan. 8, 1971, Pat. No. 3,729,343.

[52] U.S. Cl. .................. 136/225; 136/211; 136/212

[51] Int. Cl.² .................... H01L 35/04; H01L 35/28

[58] Field of Search ............ 136/211, 212, 225, 201

[56] References Cited

UNITED STATES PATENTS

| | | | |
|---|---|---|---|
| 2,278,744 | 4/1942 | Sparrow et al. | 136/201 X |
| 2,916,537 | 12/1959 | Reid et al. | 136/225 X |
| 3,284,245 | 11/1966 | Nottage et al. | 136/212 |
| 3,427,209 | 2/1969 | Hager | 136/225 |
| 3,535,523 | 10/1970 | Wunderman et al. | 136/225 UX |
| 3,607,445 | 9/1971 | Hines | 136/225 |
| 3,611,327 | 6/1972 | Gay | 136/225 |

*Primary Examiner*—Benjamin R. Padgett
*Assistant Examiner*—E. A. Miller
*Attorney, Agent, or Firm*—N. T. Musial; J. A. Mackin; John R. Manning

[57] ABSTRACT

A thermocouple which may be rolled as a tape until needed and a method of making same are described. Thermoelectrically different metals are applied to a strip of electrically nonconductive material in longitudinally overlapping relationship. Apertures may be provided along the tape in the overlapping region at predetermined intervals. An adhesive material is applied to the side of the tape opposite the thermoelectric metals either before or after the thermoelectric metals are deposited. The tapes may be cut or torn to form a thermocouple device which is ready for application to a body whose temperature is to be monitored or measured.

4 Claims, 5 Drawing Figures

THERMOCOUPLE TAPE

ORIGIN OF THE INVENTION

The invention described herein was made by an employee of the United States Government and may be manufactured and used by or for the Government of the United States of America for governmental purposes without the payment of any royalties thereon or therefor.

This is a division of application Ser. No. 104,885 filed Jan. 8, 1971, now U.S. Pat. No. 3,729,343.

BACKGROUND OF THE INVENTION

The invention relates to thermocouples and is directed more particularly to a preformed thermocouple which may be attached to the body whose temperature is to be measured.

Basically, a thermocouple comprises a junction or contact area of dissimilar metals across which there develops a voltage dependent on the temperature of the junction and the particular metals used. If two such junctions are connected in series with a voltage measuring device, the measured voltage will be approximately proportional to the temperature difference of the two junctions. One junction may serve as a reference by thermally isolating it from the other which is attached to a body, the temperature of which is to be measured.

The simplest form of thermocouple comprises a pair of wires of dissimilar metals twisted together at one end to form a junction.

Most preformed thermocouples available commercially require welding or soldering assembly techniques which are generally expensive from the standpoint of labor and apparatus costs. Thermocouple devices must also be provided with structure for attaching them to the surface of the body whose temperature is being measured or monitored. Additionally, lead wires must also be attached and connected to the junction and, because such leads are generally of a short, predetermined length, connecting leads must be attached thereto.

Many thermocouples employ thermoelectrically different metals such as platinum, platinum alloys and other noble metals which are extremely expensive. This greatly increases the cost of a thermocouple particularly where the wires must be of relatively great diameter for strength and to facilitate assembly.

In general, thermocouples of the prior art are deficient in that the junction or area of contact between the dissimilar metals is very small and, therefore, prohibits its use where an average temperature of a relatively large area is desired.

OBJECTS AND SUMMARY OF THE INVENTION

It is an object of the invention to provide a thermocouple which is inexpensive and which may be discarded after use.

It is another object of the invention to provide a thermocouple which may be dispensed in the form of a tape which may be severed by tearing or cutting to provide a thermocouple junction as well as the necessary connecting leads.

Still another object of the invention is to provide a thermocouple which may be attached to a body whose temperature is being monitored or measured without welding, soldering or gluing.

Yet another object of the invention is to provide a thermocouple in which the junction area may be as large or as small as desired.

It is yet another object of the invention to provide a thermocouple which has a very fast response time as compared to prior art thermocouples.

Another object of the invention is to provide a thermocouple tape from which any desired size thermocouple may be prepared as needed.

In summary, the invention provides an adhesive backed thermocouple tape which is inexpensive, easy to use and has a very fast response time.

DESCRIPTION OF A PREFERRED EMBODIMENT

Figure 1:
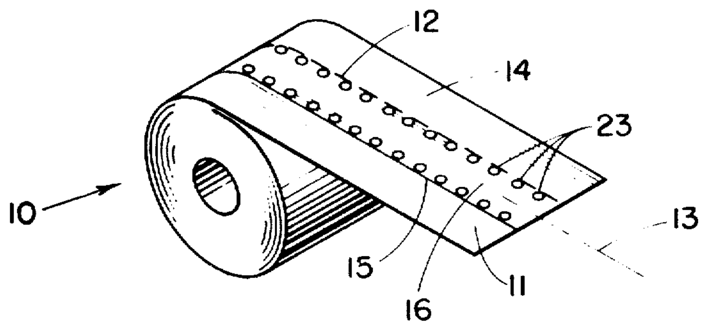
FIG. 1 is a pictorial drawing of a tape made in accordance with the invention.

Referring now to FIG. 1 there is shown a thermocouple tape 10 which is coiled or rolled so that any desired length is easily dispensible. As shown, a first metal layer 11 extends traversely across the tape for more than half its width as defined by the dashed line 12. The dashed line 12 is more than one-half width of the tape from one edge, the center line of the tape being indicated by dashed line 13. A second metal layer 14 is also disposed on the tape and extends more than one-half width of the tape from the other edge thereby forming an overlapping area 16. The overlapping area 16 forms a thermoelectric junction which extends longitudinally along the tape.

Figure 2:
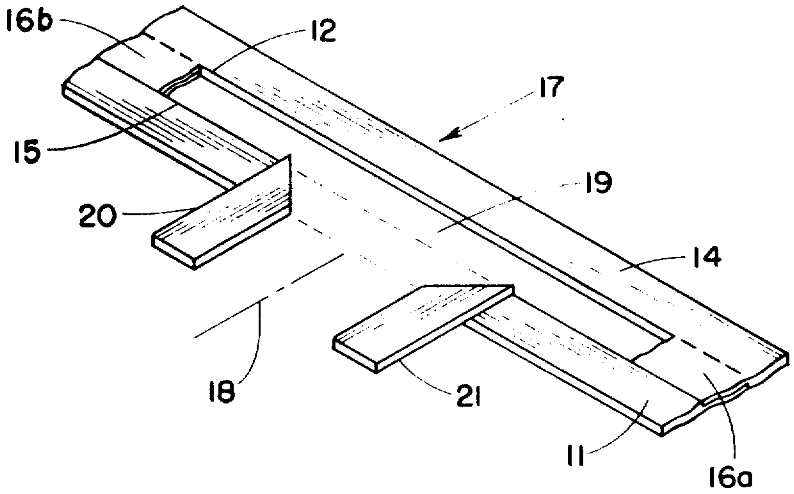
FIG. 2 is a pictorial drawing of a thermocouple made in accordance with the invention.

FIG. 2 illustrates a length of thermocouple 17 which has been severed from the roll 10 by cutting or tearing. The thermocouple of FIG. 2, ready for application to a body whose temperature is to be measured, is prepared by cutting traversely across the metal layer 11 along line 18 and by removing a section of the overlapping area 16 to form an aperture 19.

The severing and removal steps just described establish a pair of thermocouple junctions **16*a* and 16*b* together with thermocouple connecting leads 20 and 21. Junctions 16*a* and 16*b* may be utilized as hot and cold junctions, respectively, as will be understood by those skilled in the thermocouple art. As will be explained presently, a plurality of longitudinally separated apertures 19** may be formed in the tape as one of the steps in the process of making the tape.

Figure 3:
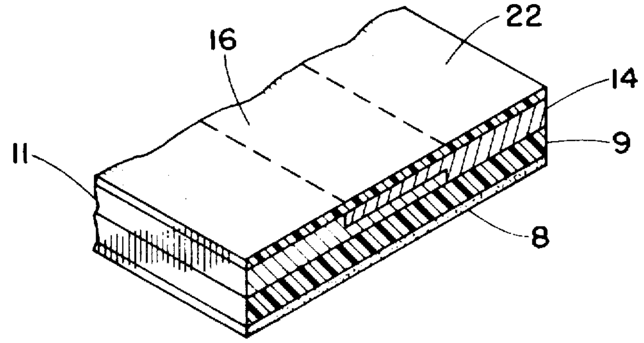
FIG. 3 is an oblique traverse section of one form of tape made in accordance with the invention.

The embodiment of the thermocouple tape shown in FIG. 3 includes a plastic protective layer 22 which is disposed over the thermocouple metals 11 and 14. The electrically nonconductive tape 9 on which the metal layers 11 and 14 are disposed is backed by an adhesive layer 8 which allows a thermocouple to be attached to a body without any auxiliary parts and without requiring any gluing, welding or the like.

The thermocouple tape embodying the invention may be made by disposing a first thin layer of metal in a strip on one side and along one edge of electrically nonconductive, flexible tape, as for example, vinyl, Mylar or cellophane tape. A second thin layer of a different metal is then disposed on the same side along the other edge of the tape in a strip which provides a longitudinally extending, overlapping area 16 with the first metal layer 11. The metal layers 11 and 14 are dissimilar metals so that a difference of potential will be generated between the metal layers 11 and 14 when heat is applied to the junction provided by the overlapping area 16. However, certain thermoelectrically different metals have advantages when used to form thermocouple junctions as known to those skilled in the art. Examples of these gold vs. cobalt; iron vs. constantan; copper vs. constantan; chromel vs. alumel; platinum vs. platinum plus rhodium; rhenium vs. tungsten; and rhenium vs. rhenium alloy.

The metal layers 11 and 14 may be applied to the tape by plating, sputtering, vapor deposition or other suitable means. The minimum thickness of layers 11 and 14 is about 4 microns while the maximum practical thickness because of mechanical stresses between the dissimilar metals is about 0.001 inch. The tape may be either stationary or moving when the metal layers 11 and 14 are applied thereto. To facilitate removal of a portion of the overlapping layer 16 to form a thermocouple device, perforations or slits 23 may be provided along both edges of the overlapping area by punching or stamping.

To further simplify the manipulations required to form a thermocouple device from the tape, apertures 19 as shown in FIG. 2 may be formed in the overlapping area 16 at longitudinally separated points along the tape. Each aperture must be at least equal in width to the width of the overlapping area 16. The length of the aperture is dependent on the desired length of the leads 20, 21 and on the desired area of junctions 16*a*, 16*b*. The apertures 19 are preferably formed before the metal layers 11 and 14 are deposited to conserve metals 11 and 14 which otherwise would be discarded with the portions removed to form the apertures 19.

The thermocouple tape is completed by applying an adhesive coating to the back surface. For certain applications where it may be desired to protect the thin metal layers 11 and 14 from damage, a layer of plastic material may be applied over the metal layers.

Figure 4:
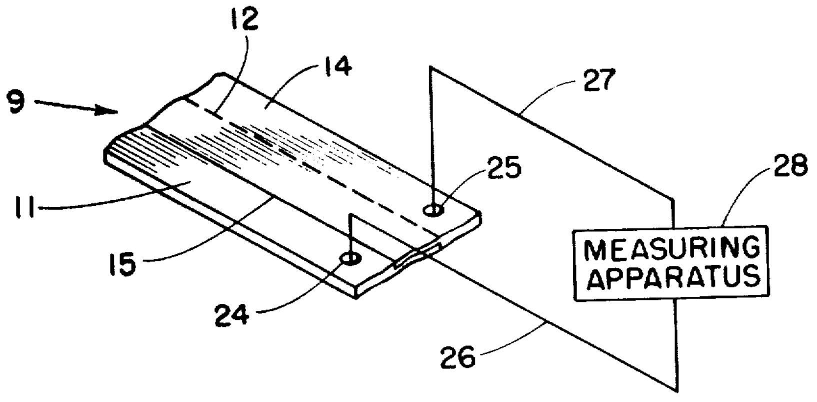
FIG. 4 is a pictorial drawing of a thermocouple made by severing a section of the thermocouple tape embodying the invention.

FIG. 4 illustrates a thermocouple formed from a portion 9 of the tape 10 of FIG. 1 and like parts are identified by like numerals. Drops of solder 24, 25 attach leads 26 and 27, respectively, to the respective metal layers 11 and 14. The leads 26 and 27 are connected to a suitable measuring apparatus 28. The thermocouple is then pressed onto the object whose temperature is being measured.

Figure 5:
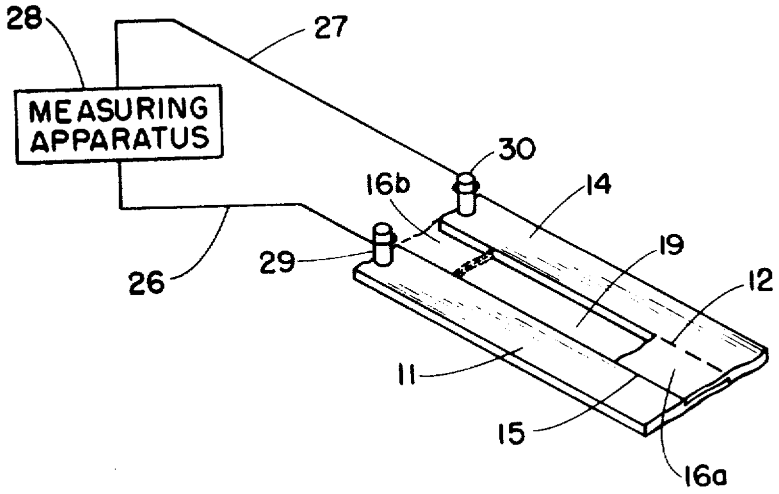
FIG. 5 is a pictorial drawing of another embodiment of a thermocouple embodying the invention.

FIG. 5 illustrates a thermocouple which is similar to that shown in FIG. 2 and like parts are identified by like numerals. In the thermocouple of FIG. 5 the whole junction area 16 extending from the hot junction 16 at the one end of the tape to the other end of the tape is removed thereby eliminating cold junction 16*b*. With this configuration the metal layers 11 and 14 serve as connecting leads without severing the metal layer 11 as in FIG. 2.

The metal layers 11 and 14 are connected via leads 26 and 27 to a measuring apparatus 28. The leads 26 and 27 are attached to metal layers 11 and 14 by connectors 29 and 30, respectively, which may be terminal posts, clips or solder. As will be clear to those skilled in the art, leads 26 and 27 may be selected from metals which will establish a cold or reference junction at either 29 or 30. For example, if lead 26 is copper and layer 11 is constantan, connector 29 will be a reference junction provided lead 27 is of the same metal as lead 14.

For some applications, the leads 26 and 27 may be eliminated by attaching the metal layers 11 and 14 of the embodiment of FIG. 5 directly to the binding posts of the measuring instrument.

While a preferred embodiment of the invention has been described, it will be understood that changes and modifications to the invention may be made by persons skilled in the thermocouple art without departing from the spirit and scope of the invention as set forth in the claims appended hereto. For example, the width of one of the metal layers might be much less than one half the width of the tape provided that the other layer is of sufficient width to provide an overlapping area extending along the tape. Also, the metal strips may be set in towards the center of the tape rather than being disposed along respective edges.

What is claimed is:

1. A thermocouple tape comprising:

an elongated strip of flexible electrically nonconductive material having at least one aperture therein;

a first strip of a first thermoelectric metal disposed on one side of said tape; and a second strip of a second thermoelectric metal disposed on said one side of said tape parallel to said first strip, said first and second strips overlapping along the length of said tape except at said aperture, said aperture having a width at least equal in width to said overlapping area whereby at least two longitudinally extending junctions are formed on said tape, the portions of said first and second layers on each side of said junctions and said at least one aperture serving as connecting leads.

2. The thermocouple tape of claim 1 wherein the width of each of said first and second strips is greater than one-half the width of said tape.

3. The thermocouple tape of claim 1 in which each of said any pair of overlapping areas is substantially shorter in longitudinal direction than any adjacent aperture.

4. The thermocouple tape of claim 1 and including a cover disposed over said first and second layers on said tape.

* * * * *